US012773305B2

(12) United States Patent
Shemesh et al.

(10) Patent No.: US 12,773,305 B2
(45) Date of Patent: Oct. 27, 2026

(54) INHALATION EXPOSURE SYSTEMS AND METHODS

(71) Applicant: Data Sciences International Inc., St. Paul, MN (US)

(72) Inventors: UV Shemesh, Minneapolis, MN (US); Michael Tyler, White Bear Lake, MN (US)

(73) Assignee: Data Sciences International Inc., Saint Paul, MN (US)

( * ) Notice: Subject to any disclaimer, the term of this patent is extended or adjusted under 35 U.S.C. 154(b) by 890 days.

(21) Appl. No.: 18/113,441

(22) Filed: Feb. 23, 2023

(65) Prior Publication Data

US 2023/0263610 A1 Aug. 24, 2023

Related U.S. Application Data

(60) Provisional application No. 63/320,004, filed on Mar. 15, 2022, provisional application No. 63/313,646, filed on Feb. 24, 2022.

(51) Int. Cl.

| | |
|---|---|
| ***A61D 7/00*** | (2006.01) |
| ***A01K 1/03*** | (2006.01) |
| ***A61D 7/04*** | (2006.01) |
| ***A61D 99/00*** | (2006.01) |
| ***A61M 11/00*** | (2006.01) |
| ***A61M 15/00*** | (2006.01) |
| ***A61M 16/00*** | (2006.01) |
| ***A61M 16/16*** | (2006.01) |

(52) U.S. Cl.

CPC ................. *A61D 7/00* (2013.01); *A61D 7/04* (2013.01); *A61D 99/00* (2013.01)

(58) Field of Classification Search

CPC . A61D 7/04; A61M 15/0086; A61M 2250/00; A61M 11/00–08; A61M 15/00–085; A61M 16/14–186; A61M 2016/1035; A61M 2016/104; A01K 1/03–0317; A61B 5/08–097

See application file for complete search history.

(56) References Cited

U.S. PATENT DOCUMENTS

| | | | | |
|---|---|---|---|---|
| 2003/0055354 | A1* | 3/2003 | Roy | A61B 5/4845 600/532 |
| 2008/0110458 | A1* | 5/2008 | Srinivasan | A61M 16/1075 128/200.14 |
| 2011/0218450 | A1 | 9/2011 | Haefner et al. | |
| 2016/0184547 | A1* | 6/2016 | Leonard | A61M 16/109 128/203.26 |
| 2018/0161531 | A1 | 6/2018 | Costella et al. | |

OTHER PUBLICATIONS

International Preliminary Report on Patentability in International Appln. No. PCT/US2023/013712, mailed on Sep. 6, 2024, 9 pages.

International Search Report and Written Opinion in International Appln. No. PCT/US2023/013712, mailed on Jun. 26, 2023, 16 pages.

* cited by examiner

*Primary Examiner* — Valerie L Woodward
*Assistant Examiner* — Mautin I Ashimiu
(74) *Attorney, Agent, or Firm* — Fish & Richardson P.C.

(57) ABSTRACT

Some embodiments of an inhalation exposure system can deliver a gas, such as an aerosol, to a set of exposure chambers in a controlled manner and can monitor one or more characteristics of the gas at a variety of aerosol delivery rates for output to a user interface. In some implementations, the improved user interface of the system may alert the user to a fitting range of aerosol delivery rates.

20 Claims, 6 Drawing Sheets

INHALATION EXPOSURE SYSTEMS AND METHODS

CLAIM OF PRIORITY

This application claims priority under 35 U.S.C § 119 to U.S. Provisional Application Ser. No. 63/313,646 filed on Feb. 24, 2022 and to U.S. Provisional Application Ser. No. 63/320,004 filed on Mar. 15, 2022, the entire contents of these earlier applications being incorporated herein by reference.

FIELD OF THE DISCLOSURE

The disclosure relates to an inhalation exposure gas delivery system and method, and more specifically, to an inhalation exposure system that identifies an inhalant delivery rate range for improved accuracy and selection by a user.

BACKGROUND

Some inhalants, pharmaceuticals, and other materials are tested on living subjects through exposure to an aerosol containing the material, which is then inhaled by the living subjects. In general, the testing is performed on animal subjects, e.g., mice, rats, which can be temporarily placed in an inhalation exposure chamber. The exposed subjects intake the aerosol based on a selected aerosol generation and respiration parameters, such as respiratory rate or volume dispensed over time. Some versions of an inhalation exposure system with a common aerosol source (e.g., having multiple exposure chambers) can monitor humidity values (or other another sensed characteristic indicative of an aerosol concentration value) for a particular aerosol delivery rates. For example, a user may select a particular aerosol delivery rate for a given round of testing to achieve a particular aerosol dosage (e.g., to each of the subjects) within an overall duration of time, yet the relationship of the aerosol delivery rate to the aerosol concentration for that particular aerosol and that particular inhalation system can be a meaningful factor in achieving such a result. In various circumstances, the sensor that is used to monitor the aerosol concentration (e.g., a humidity sensor in some versions) may become less accurate and may require an added correction factor if the selected aerosol delivery rate exceeds a threshold limit, which may not be immediately known to the user for a given aerosol within that particular inhalation exposure system.

SUMMARY

Some embodiments of an inhalation exposure system can deliver a gas, such as an aerosol, through a manifold to a set of exposure chambers in a controlled manner and can monitor one or more characteristics of the gas at a variety of aerosol delivery rates for output to a user interface. Optionally, the improved user interface of the system may alert the user to a range of aerosol delivery rates at which measurements of the aerosol concentration accurately relates to at least one other monitored characteristic of the gas. For example, the system can automatically determine an upper limit, a lower limit, or both upper and lower limits for the aerosol delivery rate—customized for a user's selected aerosol and a particular inhalation test apparatus—thereby facilitating the user's selection of a his or her desired aerosol delivery rate that will achieve improved accuracy while also achieving a particular dosage of aerosol to the test subject(s) within a given time period.

Some implementations described herein can provide a system and method for automatically measuring humidity and aerosol concentration values at a range of aerosol delivery rates (e.g., rate of nebulization of the aerosol) and determining a suggested aerosol delivery rates range. For example, the system and method can generate a user interface depicting concentration curve plotting the measured humidity and aerosol concentration values along the range of aerosol delivery rates. The system and method can determine a suggested aerosol delivery rate range, including an upper limit, a lower limit, or both upper and lower limits, in which the measured humidity and aerosol concentration values remain in linear relationship to respective aerosol delivery rates.

The systems can include an improved user interface for controlling an inhalation apparatus. The user interface can be utilized for providing the user with information indicative of the suggested aerosol delivery rate range. The user can select an aerosol delivery rate which can correspond with a known concentration value or a known humidity value. In some implementations, the system compares the user-selected aerosol delivery rate value to the aerosol delivery rate range, which can include comparing the user-selected aerosol delivery rate value upper and lower limits of the range. If the user-selected aerosol delivery rate value exceeds either the upper and lower limits, the system can provide a notification (e.g., an alert) to the user.

Particular embodiments described herein feature an inhalation exposure system including one or more inhalation exposure chambers sized to contain a test subject and being in fluid communication an aerosol flow path. The system may also include a humidity sensor positioned along the aerosol flow path to monitor humidity values of the aerosol delivered to the one or more inhalation exposure chambers; a concentration sensor positioned along the aerosol flow path to monitor aerosol concentration values of the aerosol delivered to the one or more inhalation exposure chambers. The system may further include a controller in communication with the humidity sensor and the concentration sensor, and the controller can be configured to activate delivery of an aerosol to the aerosol flow path at each of a plurality of different aerosol delivery rates. In response to the controller receiving a plurality of humidity values and aerosol concentration values at the plurality of different aerosol delivery rates, the controller may display a concentration curve showing a plot of the humidity values and aerosol concentration values relative to each of the different aerosol delivery rates. Optionally, the display of the concentration curve identifies at least an upper limit of an aerosol delivery rate at which the humidity values and aerosol concentration values remain in linear relationship to respective aerosol delivery rates.

Some implementations of the system may optionally include one or more of the following features. The controller can provide a user interface, the user interface including a user interface input field that prompts a user to input a selected aerosol delivery rate. The user interface may output an alert in response to the user inputting the selected aerosol delivery rate at a value higher than said upper limit. The controller can calculate, based at least in part upon the plurality of humidity values at the plurality of different aerosol delivery rates, a correction factor for the aerosol concentration values at a subset of the different aerosol delivery rates above the upper limit. The controller can be configured to determine (and output via the user interface) a suggested range of the concentration curve, the suggested range including a maximum humidity, a minimum humidity, a maximum inhalation gas flow rate, and a minimum inhalation gas flow rate. The controller can be configured to transmit a signal indicative of the suggested range. The controller can be configured to receive exposure values indicative of one or more exposure parameters for each test subject in each of the one or more inhalation exposure chambers, and to transmit a signal indicative of a suggested range of the concentration curve based on the exposure values. The controller can be configured to, in response to a determination that one or more exposure parameters of the exposure values exceeds the suggested range, transmit a signal indicative of the one or more exposure parameters exceeding the suggested range. The controller can be configured to, in response to a determination that one or more exposure parameters of the exposure values exceeds the suggested range, determine a correction factor of the aerosol concentration values based on the concentration curve. The controller can be configured to apply the correction factor to the aerosol concentration values to create corrected aerosol concentration values and transmit a notification indicative of the corrected aerosol concentration values.

Some embodiments described herein feature a method of operating an inhalation exposure system including delivering a flow of a gas to a set of inhalation exposure chambers sized to contain a test subject. Optionally, the gas may include an aerosol input into breathable air at a rate of nebulization. The method may also include monitoring an optical property of the flow indicative of an aerosol concentration present in the flow using at least one optical probe. The method may further include monitoring a humidity of the flow of the aerosol using at least one humidity probe. The method may also include identifying a maximum bound humidity value (or a maximum bound aerosol concentration value) at which a rate of change of the humidity (or aerosol concentration) relative to the rate of nebulization transitions from a linear relationship to a nonlinear relationship. The method may further include controlling the flow of the aerosol to the set of inhalation exposure chambers so that a humidity (or an aerosol concentration) of the flow can be maintained below the maximum bound humidity value (or maximum bound aerosol concentration value).

Some implementations of the method may optionally include one or more of the following features. The method can include receiving one or more aerosol control parameters; and transmitting a signal indicative of a suggested range of rate of nebulization based on the aerosol control parameters. The method can include transmitting, responsive to one or more aerosol control parameters exceeding the maximum bound humidity value, a signal indicative of the one or more aerosol control parameters exceeding the maximum bound humidity value. The method can include determining, responsive to one or more aerosol control parameters exceeding the maximum bound humidity value, a correction factor of the aerosol concentration values based on the humidity value. The method can include applying the correction factor to the aerosol concentration values to create corrected aerosol concentration values; and transmitting a notification indicative of the corrected aerosol concentration values.

A number of embodiments described herein include an automated inhalation gas calibration system. The system may include an aerosol exposure chamber, and a port including a valve. The valve can be configured such than when in a closed state, the valve seals the port against gaseous flow through the port. The system may also include a gas source in fluid connection with the port configured to supply a gas to the exposure chamber, the gas including an aerosol. The system may further include environmental sensors that communicate information indicative of an amount of an aerosol and a humidity of the gas. The system may also include a controller in communication with the environmental sensors and the gas source, and the controller can be configured to supply the gas at a plurality of flow rates to the port and so that, in response to receiving information indicative of an amount of the aerosol and a humidity of the gas at the plurality of flow rates, the controller generates a concentration curve based on the received information.

Some implementations of the automated inhalation gas calibration system may optionally include one or more of the following features. The controller can include a user interface, the user interface configured to receive user input indicative of one or more of the flow rates, and to transmit a signal indicative of a suggested range of the concentration curve based on the user input. The controller can be configured to, in response to a determination that one or more exposure parameters of the exposure values exceeds the suggested range, transmit a signal indicative of the one or more exposure parameters exceeding the suggested range. The controller can be configured to, in response to a determination that one or more exposure parameters of the exposure values exceeds the suggested range, determine a correction factor of the aerosol concentration values based on the concentration curve. The controller can be configured to transmit for display the concentration curve. The controller can be configured to transmit a signal indicative of the suggested range of the concentration curve. The controller can provide a user interface input field that prompts a user to input a selected inhalation gas flow rate. The user interface outputs an alert in response to the user inputting the selected gas flow rate at a value higher than said suggested range of the concentration curve. The controller calculates, based at least in part upon the amount of the aerosol and a humidity of the gas at the plurality of flow rates, a correction factor for the calculated aerosol concentration values at a subset of the different gas flow rates above the suggested range of the concentration curve. The controller can be configured to determine a suggested range of the concentration curve, the suggested range including a maximum humidity, a minimum humidity, a maximum inhalation gas flow rate, and a minimum inhalation gas flow rate. The controller can be configured to receive exposure values indicative of one or more exposure parameters for each test subject in each of the aerosol exposure chamber, and to transmit a signal indicative of a suggested range of the concentration curve based on the exposure values.

Particular implementations of the subject matter described in this specification can be implemented so as to realize one or more of the following technical advantages. Other advantages will be apparent from the description, the drawings, and the claims.

First, automatic generation of a suggested range of nebulization rates can increase the accuracy of total gas exposure for subjects when the inhalant is supplied at a rate within the suggested range.

Second, when a selected nebulization rate is outside of the suggested range, notifications to the user can include instructions for correction of the data, facilitating more precise data across subjects.

Third, the system automatically generating the data on which the suggested range reduces the overall time for pre-experiment calibration and increases overall throughput of subjects.

Fourth, the systems and methods described herein can significantly increase the efficiency for a user of an inhalation exposure system seeking to establish satisfactory parameters for a given test for a particular aerosol in an inhalation exposure system, including the benefit of achieving an accurate overall dosage of aerosol delivery within a limited duration of time for the subjects within the exposure chambers.

The details of one or more embodiments are set forth in the accompanying drawings and the description below. Other features and advantages will be apparent from the description and drawings, and from the claims.

DESCRIPTION OF DRAWINGS

In the figures, like references indicate like elements.

DETAILED DESCRIPTION

Figure 1:
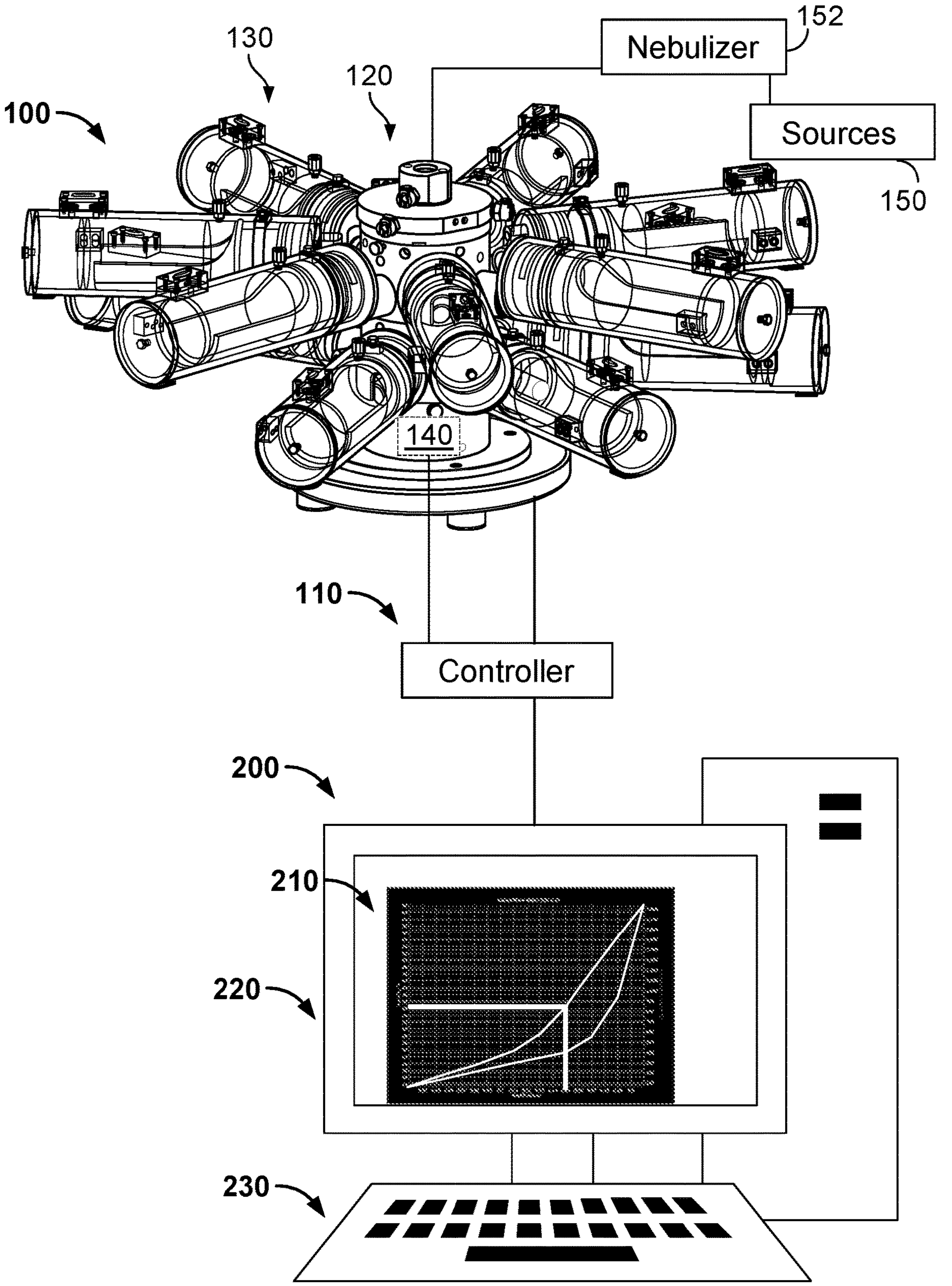
FIG. 1 is a perspective view of an inhalation exposure system in communication with a computing device in accordance with some embodiments.

Referring to FIG. 1, an inhalation exposure system 100 is shown in connection with a controller 110 and a computing device 200 displaying a user interface 210. The controller 110 can be connected in communication with an exposure apparatus 120 (e.g., an exposure tower in this embodiment) so as to deliver a gas through a manifold to a set of aerosol exposure chambers 130 (e.g., which are configured to contain test subjects). In some implementations, the gas is an aerosol, e.g., a gas which includes suspended liquids or solids.

Preferably, the gas can be delivered in a controlled manner so as to achieve improved consistency in the gas exposure (or accumulated inhaled aerosol) for all of the test subjects, even if the test subjects exhibit different respiration rates or Minute Volume (MV) in the respective exposure chambers 130. In some implementations described herein, the MV represents an estimation or calculation of the tidal volume (e.g., the amount of air that moves in or out of the lungs of a subject with each respiratory cycle) times the respiratory rate of the subject.

Determining the gas exposure for each subject includes a determination of the aerosol concentration delivered to the set of aerosol exposure chambers 130. Improved consistency can be achieved in system in which the aerosol is delivered to the set of aerosol exposure chambers 130 at an accurately measured concentration. The aerosol delivery rate range in which a substantially linear relationship exists between measured humidity values and aerosol concentration values can have increased accuracy compared to an aerosol delivery rate range in which a substantially linear relationship does not exist.

Each of the exposure chambers 130 can be configured to house an individual test subject, such as a mammal, e.g., a murine mammal (a mouse or rat), for a selected period of time, during which the inhalation exposure system 100 is configured to simultaneously delivery the gas to all of the exposure chambers 130 containing a test subject, thereby enabling the test subjects to inhale the gas. The system 100 includes one or more sensors 140 in connection with the controller 110 which monitor the respective characteristics of the gas (refer also to FIGS. 2 and 3). Examples of sensors 140 include humidity sensors, temperature sensors, optical sensors, flow rate sensors, or scattering sensors.

A gas is supplied by one or more gas sources 150 in fluid connection with the exposure apparatus 120. For example, the gas sources 150 can be pressurized canisters, or a pump. In some examples, the supplied gas can be a pure gas, or a gas mixture, e.g., atmosphere. In some implementations, the system 100 can include a nebulizer 152 in connection with the gas sources 150 which can receive the gas and introduces a material, e.g., an inhalant, to the gas to be inhaled by the subjects. The material can include liquids, or solids. For example, the material can be liquid droplets, such as water droplets, droplets of aqueous solutions, or solid particulates, such as ash. In some implementations, the gas containing the inhalation material can be delivered the gas inlet 154 at a rate in a range from 0.1 standard liters per minute (SPLM) to 20 SPLM (e.g., from 0.5 SPLM to 1 SPLM).

Continuing to refer to FIG. 1, the controller 110 is in communication with the computing device 200 which can receive input from a user (e.g., through input device 230) and can display information to a user (e.g., through display 220). The computing device 200 can execute computer-readable instructions stored in non-volatile memory that cause the display of the user interface 210, which provides for user input fields (e.g., to input control parameters to computing device 200 for communication to the controller 110) and enhanced display of feedback, alerts, or other operational information to the user. (Additional examples of the user interface 210 are described below in connection with FIG. 5.) In the depicted example illustrated in FIG. 1, the computing device 200 is connected to the controller 110, and in other optional embodiments, the controller 110 and the computing device 200 may be integrated together in a single device in communication with the exposure apparatus 120.

The computing device 200 can receive input, such as commands or values, and transmit the commands or values. In some implementations, the computing device 200 can be in wired or wireless communication with the controller 110.

Figure 5:
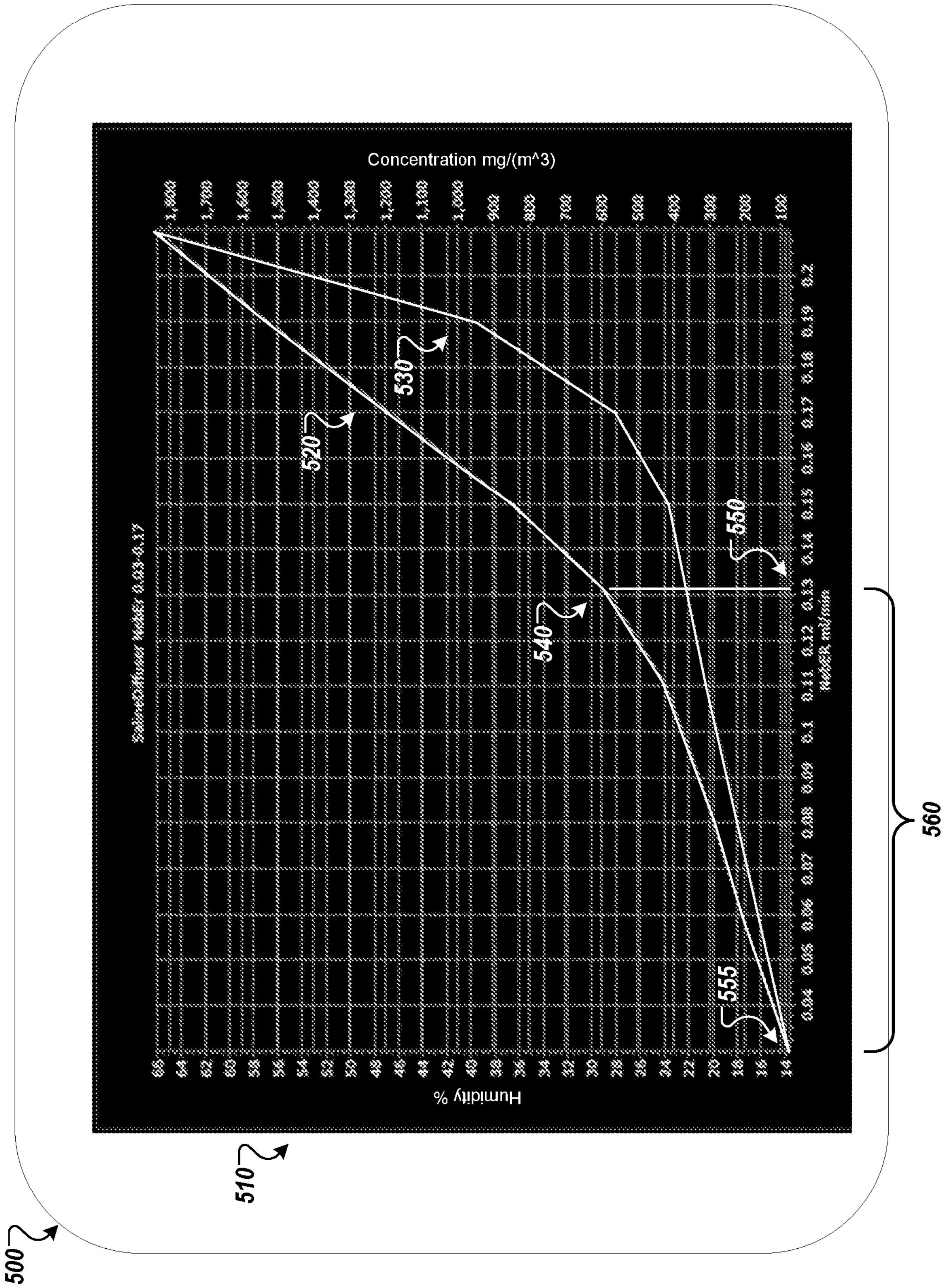
FIG. 5 is an illustrative screen view of an example user interface of the system of FIG. 1, in accordance with some embodiments.

In some implementations, the computing device 200 can display data collected by the controller 110 to the user in a chart (described further with reference to FIG. 5). The user can determine an aerosol delivery rate range at which a substantially linear relationship exists between measured humidity values and aerosol concentration values. The user can input an aerosol delivery rate value into the input fields of the user interface 210 within the determined aerosol delivery rate range.

In some implementations, the computing device 200 can store instructions for the inhalation exposure system 100, or the controller 110, which control gas sources 150 to provide the gas at a flow rate to the exposure apparatus 120 to determine an aerosol delivery rate range at which a substantially linear relationship exists between measured humidity values and aerosol concentration values. For example, the substantially linear relationship can be determined by the computing device 200 performing a linear regression algorithm on one or more subsections of the data. The computing device 200 can compare the output of the linear regression algorithm for each of the one or more subsections to a linearity threshold value. The computing device 200 can determine in which subsection the linearity threshold value is exceeded, and output the aerosol delivery rate range in which the linearity threshold value is not exceeded.

The gas is supplied by one or more gas sources 150 in fluid connection with a gas inlet 154 of the manifold 122. For example, the gas sources 150 can be pressurized canisters, or a pump. In some examples, the supplied gas can be a pure gas, or a gas mixture, e.g., atmosphere. In some implementations, the system 100 can include a nebulizer 152 in connection with the gas sources 150 which can receive the gas and introduces a material to the gas to be inhaled by the subjects. The material can include liquids, or solids. For example, the material can be liquid droplets, such as water droplets, droplets of aqueous solutions, or solid particulates, such as ash. In some implementations, the gas containing the inhalation material can be delivered the gas inlet 154 at a rate in a range from 0.1 standard liters per minute (SPLM) to 20 SPLM (e.g., from 0.5 SPLM to 1 SPLM).

The computing device 200 can provide instructions to the nebulizer 152 to supply the inhalant to the gas at a set of nebulization rates. For example, the computing device 200 can provide instructions to the nebulizer 152 to supply the inhalant to the gas a first nebulization rate. The nebulization rate increases the concentration of the inhalant within the gas to a first concentration. In some implementations, the nebulization rate can be in a range from 0.001 milliliter per minute (ml/min) to 1 ml/min (e.g., 0.01 ml/min to 0.5 ml/min).

Figure 2:
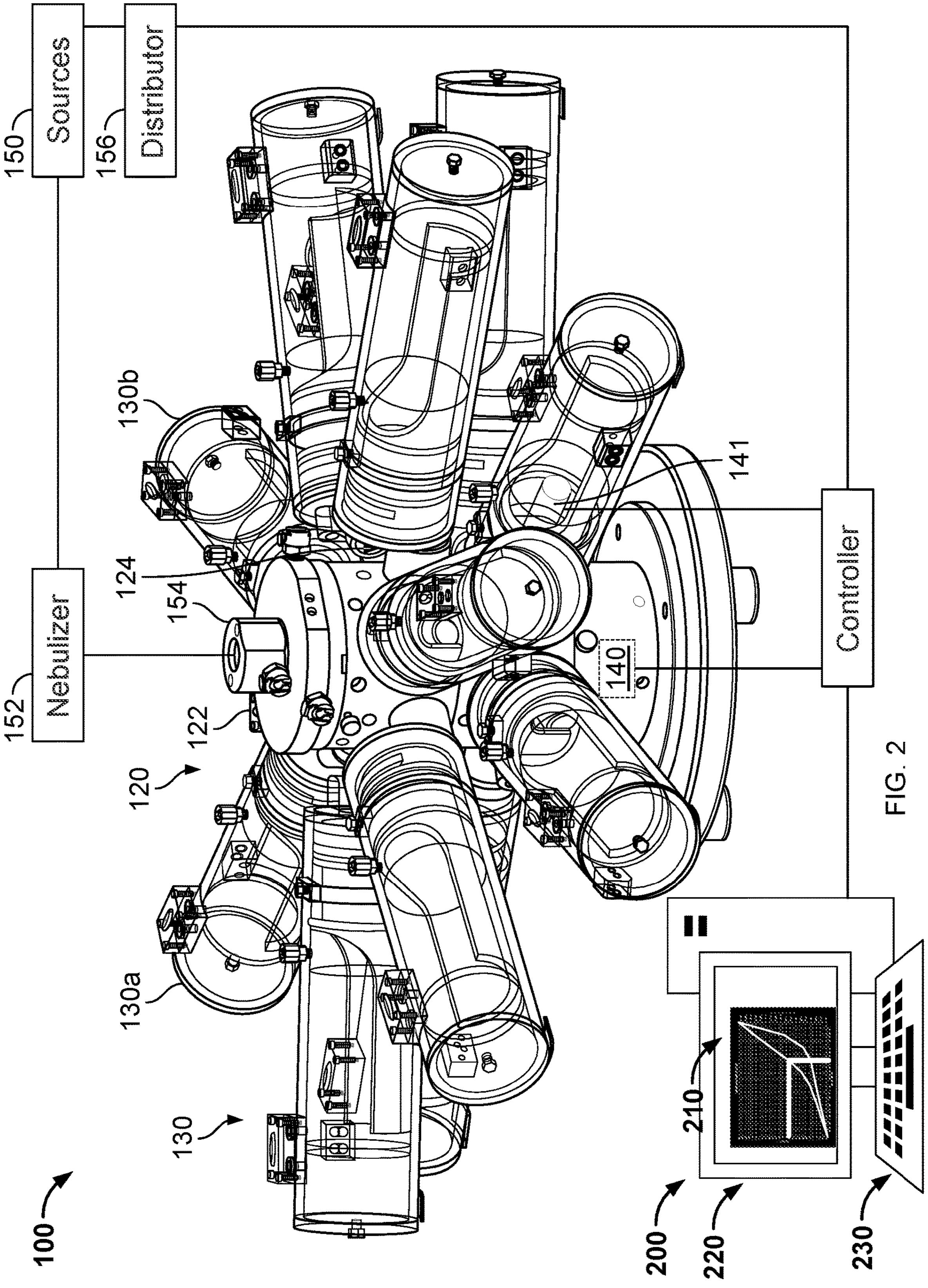
FIG. 2 is perspective view of the inhalation exposure system of FIG. 1, in accordance with some embodiments.
Figure 3:
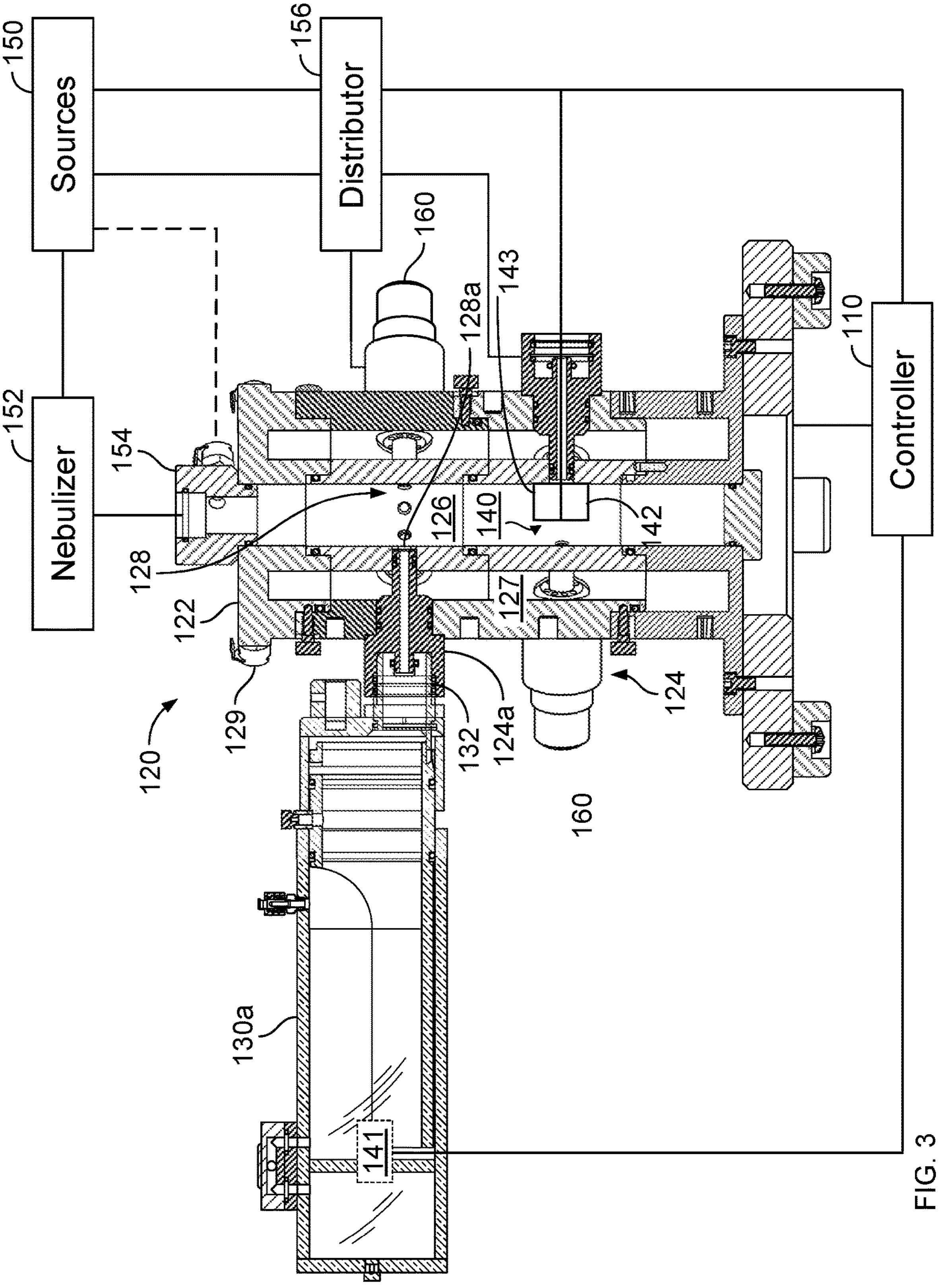
FIG. 3 is a cross-sectional view of the inhalation exposure system of FIG. 1, in accordance with some embodiments.

The system 100 can includes one or more sensors 140 in connection with the controller 110 which monitor respective characteristics of the gas (refer also to FIGS. 2 and 3). Examples of sensors 140 include humidity sensors, temperature sensors, optical sensors, flow rate sensors, or scattering sensors.

The gas carrying the inhalant enters the exposure apparatus 120 and the sensors 140 generate signal indicative of one or more exposure parameters of the gas. In some implementations, the sensors 140 generate signals indicative of a humidity, an inhalant concentration, or both. The controller 110 receives the signals from the sensors 140 and transmits values, e.g., a humidity value, a concentration value, or both, to the computing device 200 corresponding to the received signals.

The computing device 200 can receive the values from the controller 110 corresponding to the first nebulization rate of the set of nebulization rates. The computing device 200 can store the values and then direct the nebulizer 152 to supply the inhalant to the gas the remaining nebulization rates of the set. At each nebulization rates of the set, the computing device 200 can receive corresponding values from the sensors and store the values as data.

The computing device 200 can determine a suggested nebulization rate range in which the humidity values and concentration values are substantially linear with the set nebulization rate values. The computing device 200 can calculate an inflection point in the humidity or concentration data and, from the values of the inflection point, set an upper and lower bound value for the suggested nebulization rate range.

The computing device 200 can include an input device 230 and a display 220. The computing device 200 can include instructions stored on a non-volatile medium that when executed by a processor create a user interface 210. The user interface 210 can receive input from a user, or display information.

In some implementations, one or more exposure parameters of the test can be set by a user. The user can input one or more values, such as a nebulization rate value. The computing device 200 can compare the user input values to the upper and lower bound values and determine if the user input values exceeds the upper and lower bound values. In such instances, the computing device 200 can cause a notification to be displayed to the user via a user interface 210.

The computing device 200 can display the humidity values and concentration values on the user interface 210 in a plot form, such as the plot depicted in the example of FIG. 1 or FIG. 5. As detailed below in connection with FIG. 6, computing device 200 may include a processor that provides for coordination of the other components of the computing device 200 to achieve control of the user interface 210.

Referring to FIGS. 2 and 3, details of the inhalation exposure system 100 are shown. The set of exposure chambers 130 includes individual exposure chambers, such as exposure chamber 130*a* and exposure chamber 130*b*. The set of exposure chambers 130 are reversibly connected to the manifold 122 by respective port assemblies 124. In the depicted embodiment, the port assemblies 124 can be controlled by the controller 110 to individually regulate the flow of the gas from the manifold 122 to set of exposure chambers 130. In some implementations the port assemblies 124 may optionally be actuated by gas pressure, which can be delivered from the gas sources 150 (providing pressurized gas to a gas distributor 156 having outlets individually connected to each of the port assemblies 124). In such optional implementations, the gas sources 150 and the gas distributer 156 can be integrated into a single unit. In further implementations the gas sources 150 and the gas distributer 156 can be integrated into the controller 110. In these optional implementations, the controller 110 may regulate pressurized gas flow from each outlet of the gas distributor 156 to individually control the gating state of the port assemblies 124, or the controller 110 may have an electrical connection to electrically actuated port assemblies 124 to individually control the gating state of the port assemblies 124.

Each exposure chamber 130 can include one or more respiration sensors 141, which can receive information indicative of one or more exposure parameters of the particular subject located within a respective chamber 130, e.g., an exposure parameter value. As a first example, the respiration sensors 141 can include a plethysmograph, e.g., an instrument for recording and measuring variation in the volume of a part of the body of the subject.

In some implementations, the exposure chamber 130 can include a flexible membrane through which a portion of the subject is placed. In one example, a subject is placed in the exposure chamber 130 such that the head (or a portion thereof, e.g., a nose) is placed through the flexible membrane. In such implementations, the gas entering the exposure chamber 130 through the port assembly 124 is substantially confined to the volume surrounding the head of the subject.

As an optional example, the exposure sensors 141 can include an optical sensor, such as a photometer for determining an aerosol content of the gas provided to the respective exposure chamber 130.

In some optional implementations, the optical sensor is integrated with or otherwise attached to a corresponding port assembly 124. Alternatively or in addition to the optical sensor being attached to the port assembly 124, the exposure chamber 130 can include a flexible membrane through which a portion of the subject is placed. In one example, a subject is placed in the exposure chamber 130 such that the head (or a portion thereof, e.g., a nose) is placed through the flexible membrane. In such implementations, the gas entering the exposure chamber 130 through the port assembly 124 is substantially confined to the volume surrounding the head of the subject. Examples of exposure parameters include a respiration rate of the subject, a respiration volume of the subject, information indicative of an aerosol content in the exposure chambers 130, or a combination thereof. The controller 110 can receive the exposure parameter values (e.g., the respiration rate, respiration volume, aerosol content information, or a combination thereof), and individually determine an accumulated inhaled aerosol dose for each subject in respective chambers 130. In one example, the accumulated aerosol dose for each subject can be determined by the product of respiration volume*aerosol content. In some implementations, the controller 110 can determine a time period in which the aerosol is supplied to the respective exposure chambers 130, such as the time period during which one or more port assemblies 124 are in an open state and aerosol is being provided to the respective exposure chambers 130.

Referring to FIG. 3, a cross section through the manifold 122, exposure chamber 130*a*, and the respective port assembly 124*a* is shown. Gas from the gas sources 150 and/or nebulizer 152 can enter the manifold 122 through the gas inlet 154. The gas inlet 154 connects to an inner lumen 126 of the manifold 122. The inner lumen 126 receives the gas and includes one or more delivery ports 128 through which the port assemblies 124 connect to the inner lumen 126. In optional implementations, the nebulizer 152 is connected to the gas inlet 154 while the gas sources 150 connects downstream of the gas flow from the nebulizer 152 (shown in dashed line). The nebulizer 152 can provide the aerosol to the gas inlet 154 while the gas sources 150 can dilute and carry the aerosol. When the port assembly 124*a* are in the open state, the gas is distributed through the port assemblies 124 to the connected set of exposure chambers 130. For example, port assembly 124*a* connects exposure chamber 130*a* to the inner lumen 126 through delivery port 128*a*.

When assembled, the set of exposure chambers 130 can define respective inner volumes which can enclose a subject. The subject can be oriented within exposure chamber 130*a* having the head nearest the manifold 122. The exposure chamber 130*a* can include a mounting adapter 132 which mates the exposure chamber 130*a* to the port assembly 124*a*. Gas from the inner lumen 126 flows through the port assembly 124*a* and the mounting adapter 132 into the exposure chamber 130*a* exposes the subject to the gas which the subject can then respire, e.g., inhale and exhale. In some implementations, the respective chambers 130 can include respiration sensors 141. The respiration sensors 141 receive information indicative of the respiration rate and/or volume and transmit the information to the controller 110.

The sensors 140 can include a humidity sensor 142 and an optical sensor 143. In some implementations, the humidity sensor 142 and the optical sensor 143 are arranged within one of the port assemblies 124. Arranging the humidity sensor 142 and the optical sensor 143 within the lumen of an open port assembly 124 can seal the port assembly 124 against gaseous flow. In some implementations, the optical sensor 143 is a scattering sensor which measures a level of light scattering in the gas.

The humidity sensor 142 can produce signals indicative of a humidity level of the gas in the inner lumen 126. The optical sensor 143 can produce signals indicative of an aerosol concentration of the gas received from the inner lumen 126. In some implementations, the sensors 140 can be arranged such that measurements are taken near a breathing zone of the subject, e.g., about ½" from where the aerosol enters the inner lumen 126. The humidity sensor 142 and the optical sensor 143 are in electronic communication with the controller 110 which can receive the signals from the humidity sensor 142 and the optical sensor 143. The controller 110 receives the signals and transmits corresponding data which can include humidity values and concentration values. In some implementations, the controller 110 can store the data. In optional implementations, the sensors 140 can be provided in a single housing, or a single probe.

The aerosol and respired gas from the subjects exit the set of exposure chambers 130 through the port assemblies 124. Outflow gas from the port assemblies 124 enters the outer lumen 127. The outer lumen 127 is separated from the inner lumen 126. The manifold 122 can include outflow ports 129 which actively or passively vent the outflow gas from the outer lumen 127. For example, in particular implementations, the outflow ports 129 can connect to a negative pressure source which may actively draw outflow gas from the outflow ports 129. In such implementations, connecting gas inlet 154 to a positive pressure source, such as gas sources 150, and outflow ports 129 to a negative pressure source can facilitate regulation of inflow to a first flow rate and varying the negative pressure facilitates maintenance of positive or negative differential pressure in the manifold 122 with respect to ambient air pressure.

Additionally or alternatively, one or more electromechanical valves connected to outflow ports 129 can vent to the surrounding atmosphere. In implementations including such valves, the valves may actuate in the event of an overpressure condition and/or to help limit fluctuations in pressure within the manifold 122.

In implementations in which one or more port assemblies 124 does not have a respective exposure chamber 130, respective plugs 160 can seal the port assemblies 124 against gaseous flow from the plugged port assemblies 124.

Figure 4:
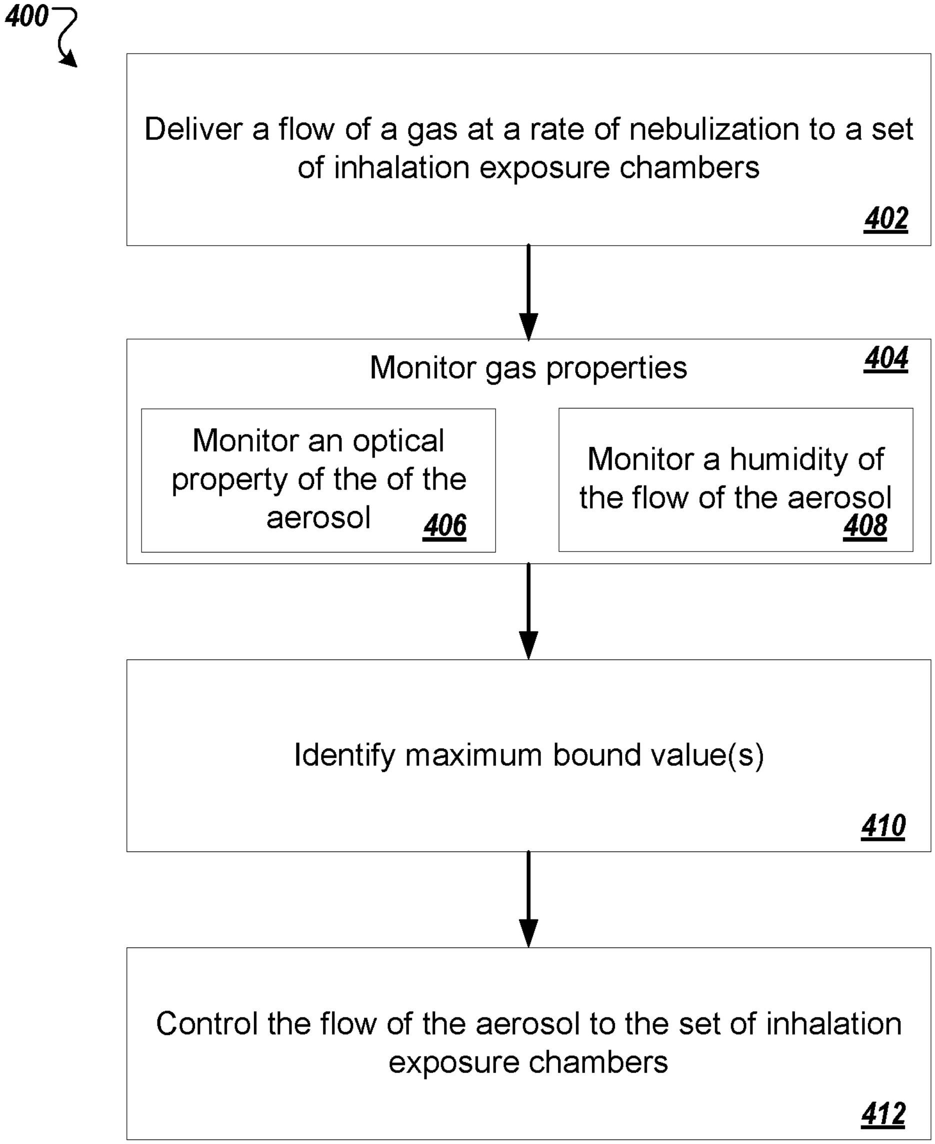
FIG. 4 is a flow chart diagram of a method for delivering an aerosol to an exposure chamber, in accordance with some embodiments.

Referring now to FIG. 4, a workflow diagram of an exemplary method 400 for determining a suggested range of aerosol delivery rates is shown. The method 400 can be performed on the computing device 200 in connection with the inhalation exposure system 100 as described above, or another computing device networked to the inhalation exposure system 100.

A flow of a gas at a rate of nebulization is delivered to a set of inhalation exposure chambers in step 402. A computing device directs a controller to provide a flow of a gas from one or more gas sources. In some implementations, the gas flows to a nebulizer which provides an inhalant to the gas at a rate of nebulization. In particular implementations of the inhalation exposure system, the rate of nebulization and the rate of gas flow can define an inhalant concentration of the gas. The gas including the inhalant is delivered to an exposure apparatus. The exposure apparatus includes a humidity sensor and an optical sensor.

The computing device monitors gas properties of the gas flowing through the exposure apparatus in step 404. The computing device can monitor an optical property of gas including the aerosol in step 406. In some implementations, the optical property, such as scattering of the gas, is indicative of an aerosol concentration of the gas. The computing device receives aerosol concentration values from the optical sensor.

The computing device monitors a humidity of the gas including the aerosol in step 408. The computing device receives humidity values from the humidity sensor indicative of a humidity of the gas. In some implementations, the computing device receives the humidity values and the concentration values from the controller.

The computing device identifies a maximum bound humidity or aerosol concentration value at which a rate of change of the humidity and/or aerosol concentration relative to the rate of nebulization transitions from a linear relationship to a nonlinear relationship in step 410. In some implementations, the computing device determines an inflection point to determine a range in which a substantially linear relationship between the humidity values, or the concentration values, and the aerosol delivery rate exists. For example, a linear relationship can exist between two variables if the two variables have a generally scalar relationship, e.g., the two variables define a line on when graphed on a plot.

For example, the computing device identifies an inflection point in the humidity values. In some implementations, the computing device interpolates or extrapolates a relationship between the humidity values and determines the inflection point from the interpolated or extrapolated relationship. Numerical methods for determining an inflection point are known in the art.

The computing device sets an upper limit value for the aerosol delivery rate based on the humidity value, or the interpolated or extrapolated humidity value of the relationship, of the inflection point. In some implementations, the upper limit value is identified based on concentration values and the aerosol delivery rate values.

In some implementations, the computing device can set a lower limit value for the aerosol delivery rate. In some implementations, the lower limit value can be based on the lowest received humidity value and aerosol delivery rate value. In some alternative implementations, the lower limit value can be based on other metrics, such as an interpolated or extrapolated humidity value and aerosol delivery rate value.

Referring now to FIG. 5, an example user interface 500 is shown displaying a concentration curve chart 510. The user interface 500 can be an example of the user interface 210 of FIG. 1. The concentration curve chart 510 can display the humidity and concentration values received from the controller 110 along two or more axes. The concentration curve chart 510 includes three axes, a humidity axis (left), a concentration axis (right), and an aerosol delivery rate axis (bottom). The axes of the concentration curve chart 510 displays a range of values corresponding to each axis which facilitates presenting the humidity and concentration values received from the controller 110.

The concentration curve chart 510 shows a humidity line 520 and a concentration line 530. The concentration line 530 and the humidity line 520 can be interpolated lines drawn over the humidity and concentration values received from the controller 110. In some implementations, the concentration line 530 and the humidity line 520 can be numerically generated lines based on an algorithm for determining lines of best fit to data.

The concentration curve chart 510 can display a suggested range 560 of aerosol delivery rates. The suggested range 560 can be determined based on the computing device 200 calculating a relationship between the concentration line 530 and the humidity line 520 as described with reference to FIG. 4. In some implementations, the relationship can be determined between the humidity and concentration values received from the controller 110.

The concentration curve chart 510 can display an inflection point of the humidity line 520, or the concentration line 530, in addition to the suggested range 560. For example, concentration curve chart 510 can display humidity inflection point 540, e.g., an inflection point in the concentration line 530.

The concentration curve chart 510 can display an upper limit value for the aerosol delivery rate based on the humidity value and the aerosol delivery rate value of the humidity inflection point 540. For example, based on the humidity inflection point 540, the concentration curve chart 510 can display the upper limit value 450.

The concentration curve chart 510 can display a lower limit value for the aerosol delivery rate based on the humidity value or the aerosol delivery rate value. For example, based on the lowest aerosol delivery rate value received from the controller 110, the concentration curve chart 510 can display the lower limit value 555.

In some implementations, the user interface 500 can display notifications to the user based on one or more notification criteria. Examples of notifications can include textual messages, images, alerts, visual aids, or windows. For example, if the user inputs an aerosol delivery rate value that exceeds the upper limit value 550, the user interface 500 can display notifications to the user indicative of the delivery rate value exceeding the upper limit value 550. In some implementations, the notifications to the user can be instructions to determine a humidity correction factor or a concentration correction factor.

Figure 6:
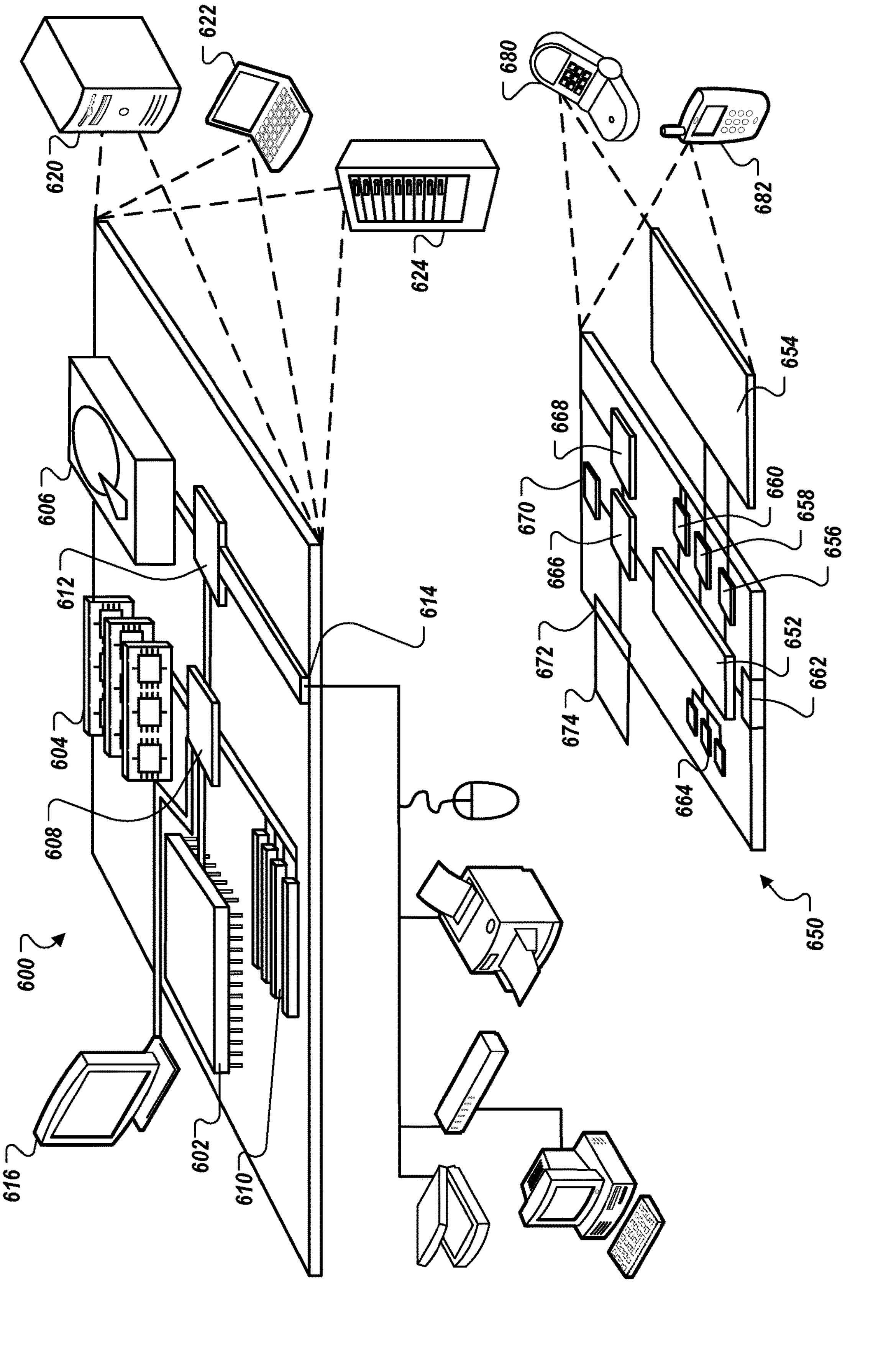
FIG. 6 is a schematic illustration of an example computer system which can be used in conjunction with the system of FIG. 1.

As noted previously, the systems and methods disclosed above utilize data processing apparatus to implement aspects of determining a suggested aerosol delivery rate range. FIG. 6 shows an example of a computing device 600 and a mobile computing device 650 that can be used as data processing apparatuses to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, and an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chip set of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single in Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 768 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., an OLED (organic light emitting diode) display or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing system can be cloud based and/or centrally processing data. In such case anonymous input and output data can be stored for further analysis. In a cloud based and/or processing center set-up, compared to distributed processing, it can be easier to ensure data quality, and accomplish maintenance and updates to the calculation engine, compliance to data privacy regulations and/or troubleshooting.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the disclosure. Accordingly, other implementations are within the scope of the following claims.

What is claimed is:

1. An inhalation exposure system, comprising:

one or more inhalation exposure chambers sized to contain a test subject and being in fluid communication with an aerosol flow path;

a humidity sensor positioned along the aerosol flow path to monitor humidity values of an aerosol delivered to the one or more inhalation exposure chambers;

a concentration sensor positioned along the aerosol flow path to monitor aerosol concentration values of the aerosol delivered to the one or more inhalation exposure chambers; and a controller in communication with the humidity sensor and the concentration sensor configured to activate delivery of the aerosol to the aerosol flow path at each of a plurality of different aerosol delivery rates, wherein in response to the controller receiving a plurality of humidity values and aerosol concentration values at the plurality of different aerosol delivery rates, the controller displays a concentration curve showing a plot of the humidity values and aerosol concentration values relative to each of the different aerosol delivery rates, and the display of the concentration curve identifies an upper limit of an aerosol delivery rate at which the humidity values and aerosol concentration values remain in linear relationship to respective aerosol delivery rates.

2. The system of claim 1, wherein the controller provides a user interface, the user interface comprising a user interface input field that prompts a user to input a selected aerosol delivery rate, wherein the user interface outputs an alert in response to the user inputting the selected aerosol delivery rate at a value higher than said upper limit.

3. The system of claim 1, wherein the controller calculates, based at least in part upon the plurality of humidity values at the plurality of different aerosol delivery rates, a correction factor for the aerosol concentration values at a subset of the different aerosol delivery rates above the upper limit.

4. The system of claim 1, the controller is further configured to: determine a suggested range of the concentration curve, the suggested range comprising at least one of a maximum humidity, a minimum humidity, a maximum inhalation gas flow rate, a minimum inhalation gas flow rate, a maximum aerosol delivery rate, and a minimum aerosol delivery rate;

and transmit a signal indicative of the suggested range.

5. The system of claim 1, the controller is further configured to receive exposure values indicative of one or more exposure parameters for each test subject in each of the one or more inhalation exposure chambers, and to transmit a signal indicative of a suggested range of the concentration curve based on the exposure values, and in response to a determination that one or more exposure parameters of the exposure values exceeds the suggested range, transmit a signal indicative of the one or more exposure parameters exceeding the suggested range.

6. The system of claim 5, the controller is further configured to, in response to the determination that one or more exposure parameters of the exposure values exceeds the suggested range, determine a correction factor of the aerosol concentration values based on the concentration curve.

7. The system of claim 6, the controller is further configured to apply the correction factor to the aerosol concentration values to create corrected aerosol concentration values and transmit a notification indicative of the corrected aerosol concentration values.

8. The system of claim 1, wherein each inhalation exposure chamber of said one or more inhalation exposure chambers defines a cylindrical inner volume sized to enclose the test subject so that a head of the test subject is oriented nearest a gas delivery manifold configured to supply the aerosol to all of said one or more inhalation exposure chambers.

9. The system of claim 8, wherein both the humidity sensor and the concentration sensor are located within an inner lumen of the gas delivery manifold.

10. An inhalation gas system, comprising:

an aerosol exposure chamber;

a port comprising a valve, the valve configured such than when in a closed state, the valve seals the port against gaseous flow through the port;

a gas source in fluid connection with the port configured to supply a gas to the exposure chamber, the gas comprising an aerosol;

environmental sensors that communicate information indicative of an amount of the aerosol and a humidity of the gas; and a controller in communication with the environmental sensors and the gas source, the controller configured to supply the gas at a plurality of flow rates to the port and so that, in response to receiving information indicative of the amount of the aerosol and the humidity of the gas at the plurality of flow rates, the controller generates a concentration curve based on the received information.

11. The system of claim 10, the controller comprising a user interface, the user interface is further configured to receive user input indicative of one or more of the flow rates, and to transmit a signal indicative of a suggested range of the concentration curve based on the user input.

12. The system of claim 11, wherein the controller provides a user interface input field that prompts a user to input a selected inhalation gas flow rate, and the user interface outputs an alert in response to the user inputting the selected gas flow rate at a value higher than said suggested range of the concentration curve.

13. The system of claim 11, wherein the controller calculates, based at least in part upon the amount of the aerosol and the humidity of the gas at the plurality of flow rates, a correction factor for the calculated aerosol concentration values at a subset of the different gas flow rates above the suggested range of the concentration curve.

14. The system of claim 11, the controller is further configured to transmit a signal indicative of the suggested range of the concentration curve.

15. The system of claim 10, wherein the controller is configured to transmit for display the concentration curve.

16. The system of claim 10, the controller is further configured to determine a suggested range of the concentration curve, the suggested range comprising a maximum humidity, a minimum humidity, a maximum inhalation gas flow rate, and a minimum inhalation gas flow rate.

17. The system of claim 10, the controller is further configured to receive exposure values indicative of one or more exposure parameters for each test subject in each of the aerosol exposure chamber, and to transmit a signal indicative of a suggested range of the concentration curve based on the exposure values.

18. The system of claim 17, the controller is further configured to: in response to the determination that one or more exposure parameters of the exposure values exceeds the suggested range, transmit a signal indicative of the one or more exposure parameters exceeding the suggested range; and in response to a determination that one or more exposure parameters of the exposure values exceeds the suggested range, determine a correction factor of the aerosol concentration values based on the concentration curve.

19. The system of claim 10, wherein the aerosol exposure chamber defines a cylindrical inner volume sized to enclose a test subject so that a head of the test subject is oriented nearest a gas delivery manifold coupled with the port and in fluid communication with the gas source.

20. The system of claim 19, wherein the environmental sensors comprise a humidity sensor and a concentration sensor located within an inner lumen of the gas delivery manifold.

* * * * *